V. ANTOINE.
PULPING MACHINE.
APPLICATION FILED JULY 20, 1920.

1,372,001.

Patented Mar. 22, 1921.
3 SHEETS—SHEET 1.

Inventor
V. Antoine
by
Atty.

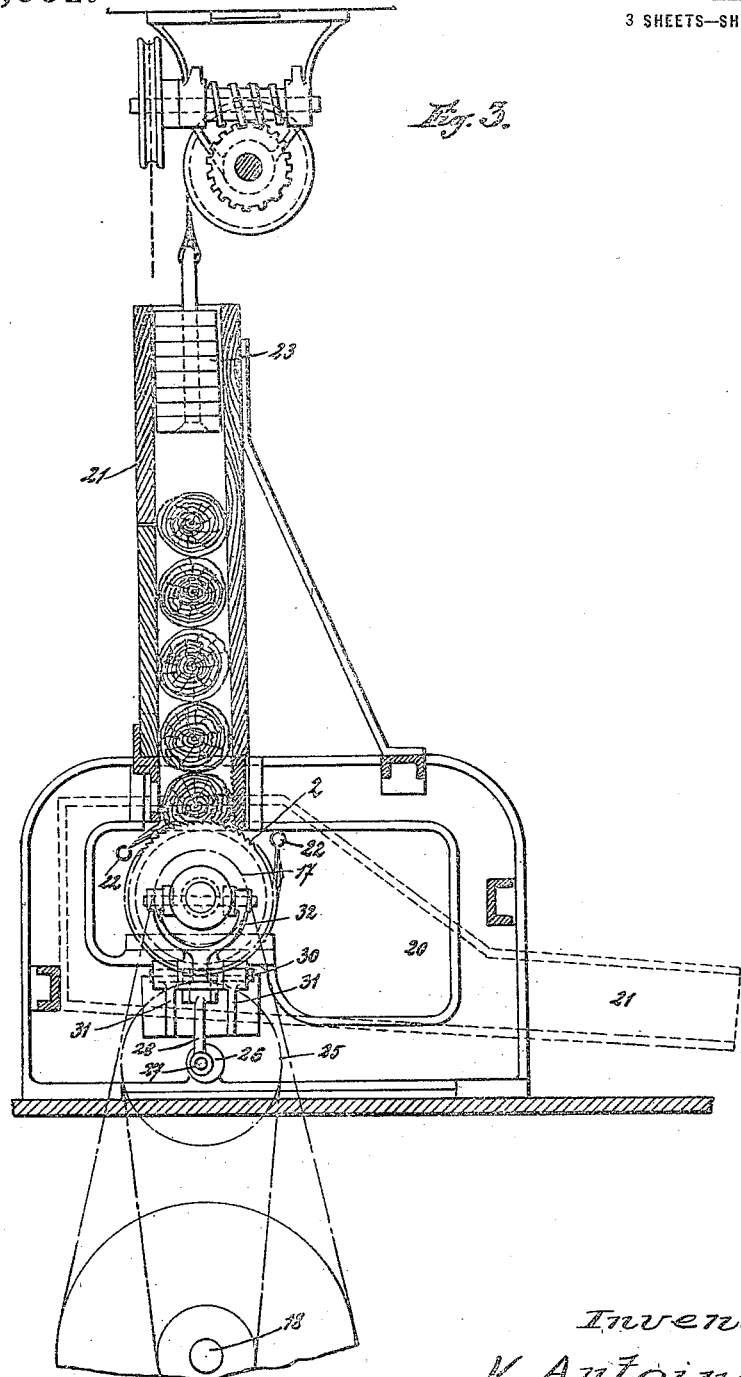

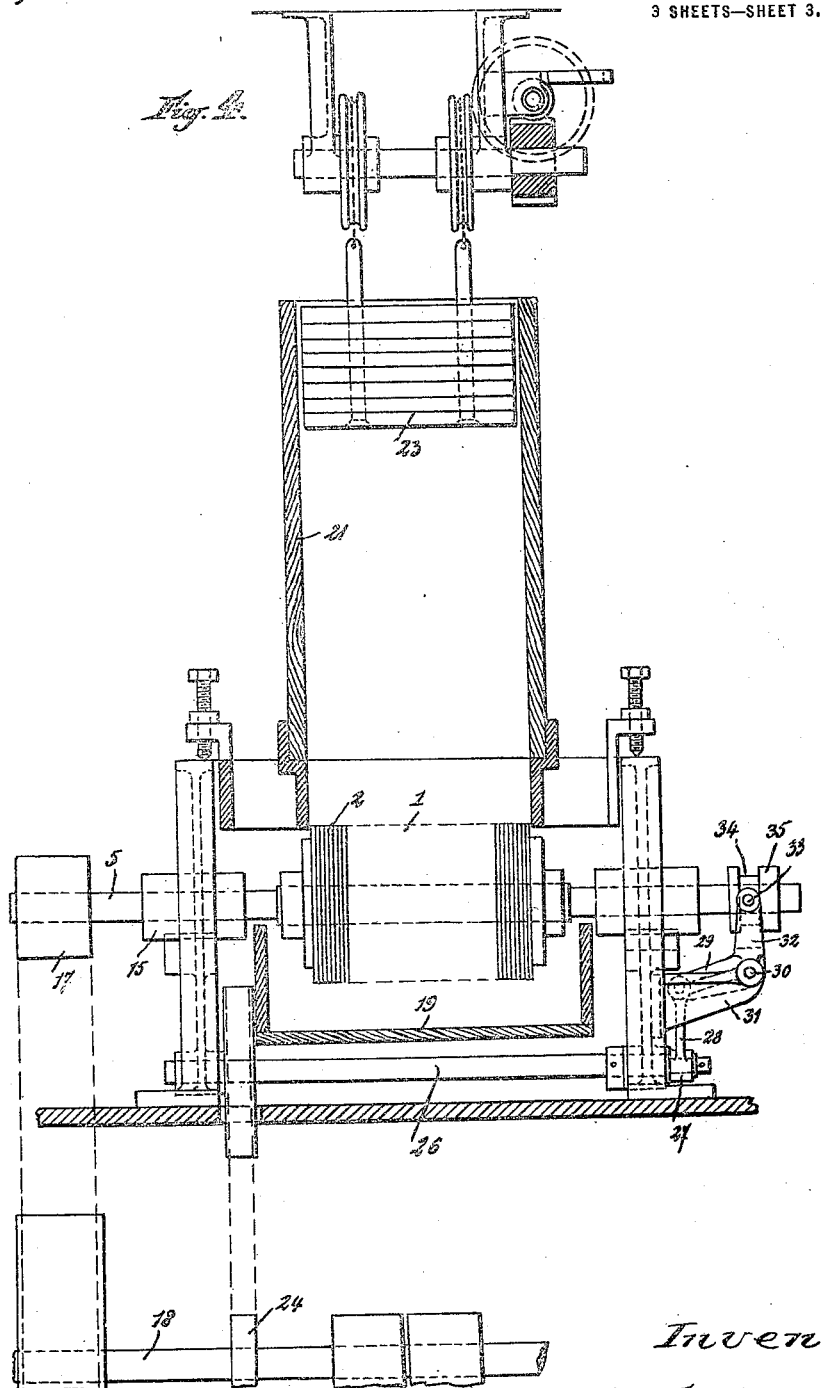

UNITED STATES PATENT OFFICE.

VICTOR ANTOINE, OF LAMBERMONT, NEAR VERVIERS, BELGIUM.

PULPING-MACHINE.

1,372,001.

Specification of Letters Patent.  Patented Mar. 22, 1921.

Application filed July 20, 1920. Serial No. 397,677.

*To all whom it may concern:*

Be it known that I, VICTOR ANTOINE, a subject of the King of Belgium, residing at Lambermont, near Verviers, in the Kingdom of Belgium, have invented certain new and useful Improvements in Pulping-Machines, of which the following is a specification.

This invention relates to improvements in pulping machines employed in paper mills for the manufacture of paper pulps and fiber-board, and more especially to apparatus of the kind comprising a lacerating member composed of a cylindrical body provided at its periphery with metal lacerating teeth analogous to the teeth of a saw.

In apparatuses of the latter kind hitherto known, the lacerating teeth are generally distributed over a certain number of blades arranged in different fields of the periphery of the drum in which the blades are held by means of regulating bolts, the fields themselves being formed by grooved plates of brass fixed by means of screws on ribs of the drum forming partitions between the fields.

These known constructions have important drawbacks among which should be noted that resulting from the fact that the drum obtained is never exactly cylindrical, which causes the wooden rollers, which are pressed against the periphery of the drum, to vibrate: on the other hand, there are between the segments formed by the blades of the saws, parts without teeth which also cause shocks causing more forcible tearing out of the wooden fibers by the first teeth of each saw-blade than in the following teeth. Finally, the saw blades being supported at the ends only by the regulating bolts, the drum as a whole lacks rigidity, and the elements which compose it are liable to become loosened and dislocated, which necessitates frequent adjustments difficult to execute.

The present invention obviates these drawbacks by the arrangement of a drum carrying one or more saw-blades arranged spirally in the form of an endless screw so as to avoid any break of continuity between the different blades which are arranged in the desired form of endless screw by being secured between two end plates and intermediate plates having lateral surfaces of helicoidal shape bearing against the blades.

An example of construction of the invention is illustrated in the accompanying drawings in which:

Fig. 3 is a vertical section of the complete apparatus taken transversely with respect to the drum.

Fig. 4 is an elevation thereof with partial section through the axis of said drum.

Figure 1:
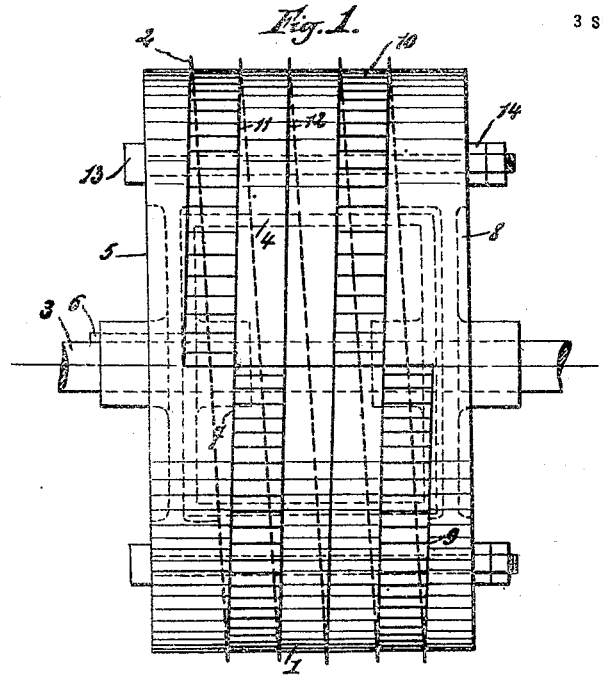
Figure 1 is an elevation of the defibrating drum constructed according to the invention.
Figure 2:
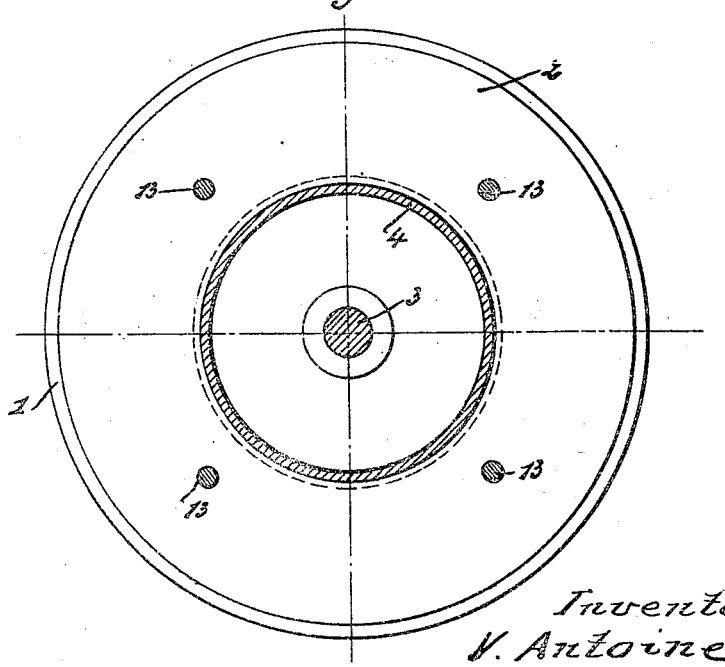
Fig. 2 is a cross section of said drum.

As shown in Figs. 1 and 2, the essential element of the apparatus consists in a drum 1 carrying on its periphery a continuous saw-blade 2 in the form of an endless screw. This drum is constructed in the following way: On the shaft 3 of the drum is mounted a cylinder 4 forming the core of the drum, the periphery of which supports the saw-blade 2 (or eventually the blades) in the form of an endless screw. Against one of the lateral faces of said cylinder 4 is keyed a disk 5 by means of a key 6. This disk has a helicoidal lateral face 7 of the value of the pitch of the screw which is to form the saw-blade 2 after mounting. Attached to the other lateral face of the drum 4 is a movable plate 8 having a surface of support 9 of a form corresponding to the helicoidal surface 7 of the plate 5. Between these two plates are arranged intermediate plates or disks 10 the lateral faces 11 and 12 of which have a helicoidal curve complementary to the face 7 and surface 9 formed by the adjacent faces of the plates 5 and 8. The intermediate plates or disks 10 can be rigid or made in a manner similar to piston rings: they are preferably formed by split plates given in the course of manufacture the desired helicoidal curve. Between the plates 10 and the end plates 5 and 8 are mounted the saw-blade or blades 2 formed preferably also by split circular saw-blades, so as to be capable of assuming by the pressure between the plates the helicoidal curve determined by the lateral faces 11 and 12 of said plates. These blades are placed one after another between the plates so as to rest with their lower edge on the periphery of the cylinder 4. They are then secured between the different plates by means of strong bolts 13 passing into the fixed plate 5, through the blades 2 and carrying tightening nuts 14 outside the movable plate 8.

The drum thus formed having at its periphery a continuous saw-blade in the form of an endless screw of uniform diameter and forming an absolutely rigid whole, is used in the pulping apparatus shown in Figs. 3 and 4. In these figures the shaft 3 rotates in bearing 15 of a frame 16. The shaft 3 is rotated at a suitable speed by a pulley 17 driven by a gearing 18. The drum rotates in a box 19 housed in the frame and communicating through an opening 20 with a channel 21 intended to convey the defibrated material toward a finishing mill or other desired place. Above the drum is placed, in the usual manner, one or more feed boxes 21 containing the pieces of wood, logs, or the like to be treated. Supplies of water 22 are employed for moistening the saw-teeth and avoid their softening and wearing away while contributing to form the liquid pulp collected in the bottom of the box 19. The pieces of wood are pressed against the defibrating drum by a pressure member 23, a weight for instance, actuated in any suitable manner, or by hydropneumatic pressure, as known in wood pulping machines.

Independently of the rotary movement, the drum is preferably also given an axial movement. For this purpose, the principal gearing 18 actuates by means of a pulley 24 and a pulley 25, an auxiliary shaft 26 driving by its eccentric end 27 a connecting rod 28 connected to an angular lever 29 oscillating at 30 in a double support 31 secured to the frame of the apparatus. The angular lever 29 forms a fork 32 provided with studs 33 which are engaged in the groove 34 of a ring 35 fixed on the shaft 3.

Under these conditions the rotation of the driving gear 18, while causing the rotation of the shaft 3 carrying the drum, causes through the shaft 26, the eccentric end 27, and the connecting rod 28, the oscillation of the lever 29 which communicates through the fork 32 an axial reciprocating movement to the shaft 3 and to the drum. This axial movement can, however, be obtained in any other suitable manner.

The drum exerts, owing to said axial movement, a multiple action on the pieces of wood to be treated, which action increases the production while procuring longer fibers than by the simple rotation of the drum.

It will be remarked that, owing to the described construction of drum, the latter forms an absolutely rigid whole, which cannot present any difference of outer diameter, the saw blade or blades resting on the periphery of the cylinder 4 which serves as their support and being kept absolutely immovable by the tightening of the plates 10. As, on the other hand, there is no solution of continuity in the screw formed by the saw-blades, the working is obtained without shocks and consequently procures an absolutely uniform treatment of the pieces of wood to be worked.

What I claim is:

1. In a pulping machine, a material feeding means, a cutting member for said material having a spiral cutting edge, means for rotating said member, and means for imparting a limited axial reciprocation to such member during its rotation, whereby through such axial movement the spiral cutting edge exerts a multiple action on the material while increasing the length of the fibers.

2. A cutting member for pulping machine comprising a drum, end members arranged on the drum and each having an inner helicoidal lateral face, a saw blade arranged spirally about and bearing on the drum, disks bearing on the drum between the blade spirals and conforming to and spacing said spirals, and means passing through the end members, saw blade and disks to secure said parts rigidly with one another.

In testimony whereof I have affixed my signature in presence of two witnesses.

VICTOR ANTOINE.

Witnesses:
J. GROSS,
CURTIS T. EVERETT.